(12) United States Patent
King

(10) Patent No.: US 10,111,795 B2
(45) Date of Patent: Oct. 30, 2018

(54) SHOWER FALL PREVENTION DEVICE

(71) Applicant: Rudolf C. King, Altenstadt (DE)

(72) Inventor: Rudolf C. King, Altenstadt (DE)

( * ) Notice: Subject to any disclaimer, the term of this patent is extended or adjusted under 35 U.S.C. 154(b) by 0 days.

(21) Appl. No.: 15/501,992

(22) PCT Filed: Aug. 20, 2015

(86) PCT No.: PCT/EP2015/069130
§ 371 (c)(1),
(2) Date: Feb. 6, 2017

(87) PCT Pub. No.: WO2016/034423
PCT Pub. Date: Mar. 10, 2016

(65) Prior Publication Data
US 2017/0224566 A1    Aug. 10, 2017

(30) Foreign Application Priority Data

Sep. 2, 2014  (DE) ......................... 20 2014 007 174

(51) Int. Cl.
*A47K 3/024* (2006.01)
*A61G 7/10* (2006.01)
(Continued)

(52) U.S. Cl.
CPC .............. *A61G 7/1003* (2013.01); *A47K 1/14* (2013.01); *A47K 3/281* (2013.01); *A61G 7/1053* (2013.01);
(Continued)

(58) Field of Classification Search
CPC ................................ A61G 7/10; A61G 7/1003
(Continued)

(56) References Cited

U.S. PATENT DOCUMENTS 371,541  A    10/1887  Beffrey
2,226,464  A    12/1940  Gora
(Continued)

FOREIGN PATENT DOCUMENTS

GB     1429779 A    3/1976
GB     2465086 A    5/2010
(Continued)

OTHER PUBLICATIONS

Int'l Preliminary Report on Patentability dated Mar. 7, 2017 in Int'l Application No. PCT/EP2015/069130.
(Continued)

*Primary Examiner* — Lauren Crane
(74) *Attorney, Agent, or Firm* — Panitch Schwarze Belisario & Nadel LLP

(57) ABSTRACT

A device may be provided for preventing fatal bathroom accidents relating to falls. Such a shower fall prevention device may be attached to a fixing point on a ceiling of a shower and may have two arm pit hooks pivotably connected to the fixing point. It may further comprise a rod connected between the fixing point and a bar, where arm pit hooks may be connected on right and left ends of the bar. The device may further comprise a strong rubber band or an extendable and retractable belt, connected between the fixing point and the rod. The device may further comprise a handle next to the rod and connected to the bar via an extension of a free end of one of the arm pit hooks, and may further comprise a cushion formed on an extension of a free end of one of the arm pit hooks.

10 Claims, 4 Drawing Sheets

(51) Int. Cl.
  *A47K 3/28* (2006.01)
  *A47K 1/14* (2006.01)
  *F16M 13/02* (2006.01)
  *G08B 21/04* (2006.01)

(52) U.S. Cl.
  CPC ......... *A61G 7/1065* (2013.01); *F16M 13/027* (2013.01); *G08B 21/0446* (2013.01)

(58) Field of Classification Search
  USPC ....... 211/119.011, 119.009; 482/69; 4/571.1, 4/254, 576.1; 248/327
  See application file for complete search history.

(56) References Cited

U.S. PATENT DOCUMENTS

| | | |
|---|---|---|
| 2008/0298183 A1 | 12/2008 | Raaymakers et al. |
| 2010/0058519 A1 | 3/2010 | Davenport |

FOREIGN PATENT DOCUMENTS

| | | | |
|---|---|---|---|
| JP | S5248547 U | 4/1977 | |
| JP | S558762 U | 1/1980 | |
| JP | 2003010262 A | 1/2003 | |
| WO | 2005/120421 A1 | 12/2005 | |
| WO | 2010/013005 A1 | 2/2010 | |

OTHER PUBLICATIONS

Office Action dated Mar. 2, 2018 in U.S. Appl. No. 15/427,133, by King.

Int'l Search Report and Written Opinion dated Feb. 24, 2016 in Int'l Application No. PCT/EP2015/069130.

Office Action dated Jul. 19, 2018 in U.S. Appl. No. 15/427,133 by King.

SHOWER FALL PREVENTION DEVICE

CROSS-REFERENCE TO RELATED APPLICATIONS

This application is a Section 371 U.S. National Stage Filing of International Application No. PCT/EP2015/0698130, filed Aug. 20, 2015, which was published in the English language on Mar. 10, 2016, under International Publication No. WO 2016/034423 A1, which claims priority to German Patent Application No. 20 2014 007 174.8, filed on Sep. 2, 2014, the disclosures of which are incorporated herein by reference.

FIELD OF ENDEAVOR

The present invention relates to devices for preventing fatal bathroom accidents. Particularly, the present invention relates to devices for preventing fatal bathroom accidents relating to falls and/or drowning.

1. TECHNICAL BACKGROUND

The present generation of elderly people remains more active than ever. Rather than moving into specially observed homes and retirement homes, they regard their own homes, having lived there for a long time, the ideal place to live after retirement and arrange themselves accordingly; this is a generational change that has happened only within the last 15 to 25 years. Before then, retirees usually considered moving to a retirement home or a living facility at a much earlier age than nowadays. Presently, retirement homes are used more to help those with pressing diseases such as dementia or other ailments requiring around-the-clock care.

Most accidents happen at home. Especially accidents in bathrooms bear a high risk of fatal injuries due to slippery surfaces and a lack of protecting clothes. For example, elderly people may faint while taking a bath. If the fainted person is not able to wake up in time, it may drown in the bath tub. Another common accident is slipping in the shower which may lead to bone fractures or similar injuries.

Accordingly, there is a need for safety methods and equipment to prevent fatal injuries in the bathroom, especially for elderly people or other susceptible persons (e.g. persons suffering from epilepsy).

Amongst the ageing and those with multiple sclerosis or epilepsy, drowning in a bathtub is a common cause of death. Once a person faints in the bath tub, the body slides down until the head is under the water surface; if he or she does not recover consciousness, drowning occurs in less than 3 minutes.

The present invention uses the movement of the fainting body to increase the chances of survival by making the water flow out of the tub.

Furthermore, slipping in showers is a known, but little researched cause of severe injuries and death amongst the elderly. The leading injuries sustained in a fall in the shower are:
  broken upper leg bones
  broken hips
  broken lower leg bones, in particular the shin
  concussions
  spinal injuries
  broken noses, fingers and hands, and
  fractured skull.

While some injuries heal, others have serious complications. For example, a broken hip of an already weak person can entail such demanding surgery that the operation might result in death.

The present invention is not trying to hinder the fall. Though attempts have been made, primarily within the American medical community, fall prevention efforts have been unsuccessful. A fall can have several causes-all of which cannot be helped by adding more handles to the shower or installing anti-skid mats. Particularly senior citizens may suddenly feel a loss in the leg muscles ("weak knees"), experience dizziness, and slip while showering; here neither the anti-skid mat nor the handles help, as the center of gravity is constantly changing when one showers.

The most perfect protection would either include a chair in the shower or wearing a belt, structured like in a parachute. However, the latter is not only uncomfortable, but difficult to put on; the areas where the belt is strapped to make it impossible to clean the underlying skin.

Though the shower chair is commonly used by people unable to stand, it still remains an uncomfortable alternative. Slipping still occurs when exiting the shower, once the chair starts to move around, or when the body is covered with soap and water.

2. BRIEF DESCRIPTION OF THE INVENTION

Accordingly, the present invention is provided as claimed in the appended independent claims. Accordingly, in a first preferred embodiment, the present invention provides a bath plug device for closing a drain pipe of a bath tub, comprising a bath plug, a cone attached to the top of the bath plug, and at least one pedal-like unit attached to the left and/or to the right of the cone.

In a second preferred embodiment, the present invention provides a bath plug device for closing a drain pipe of a bath tub, comprising a bath plug, a protrusion attached to the top of the bath plug, and at least one foot rest unit attached to the left and/or to the right of the protrusion.

In one embodiment according to the second preferred embodiment, the at least one foot rest unit (or pedal-like unit) covers substantially the whole width of the bath tub.

In one embodiment according to the first or the second preferred embodiment as described above, the bath plug device has an overall density which is slightly below the density of water such that the bath plug device starts to float as soon it is detached from the drain pipe.

In one embodiment according to the first or the second preferred embodiment as described above, the bath plug is connected via a fixed wire to either an electric motor or a compressed air tube.

In one embodiment according to the first or the second preferred embodiment as described above, a tilt sensor is fixed inside the protrusion, which in turn is wirelessly connected to a bath security switch and/or a house server.

In a third preferred embodiment, the present invention provides a shower fall prevention device, comprising a fixing point on a ceiling of a shower and two arm pit hooks pivotable connected to the fixing point.

In one embodiment according to the third preferred embodiment as described above the shower fall prevention device further comprises a rod connected between the fixing point and a bar, wherein said arm pit hooks are connected on right and left ends of the bar.

In one embodiment according to the third preferred embodiment as described above the shower fall prevention device further comprises a strong rubber band or an extendable and retractable belt rolled up in a box, fixed to the fixing point and connected between the fixing point and the rod.

In one embodiment according to the third preferred embodiment as described above the shower fall prevention device further comprises a handle next to the rod and connected to the bar via an extension of a free end of one of the arm pit hooks.

In one embodiment according to the third preferred embodiment as described above the shower fall prevention device further comprises a cushion formed on an extension of a free end of one of the arm pit hooks, wherein said cushion is movable upwards and to the side.

In a fourth preferred embodiment, the present invention provides a shower fall prevention device, comprising a strong rubber band or an extendable and retractable belt rolled up in a box, fixed to the ceiling near the center of the shower ceiling, a rod fixed to the strong rubber band or the extendable and retractable belt, an solid part (e.g. an iron part) fixed to the rod at or near the middle of a straight or slightly curved part of the solid part, a handle positioned left of the rod and connected to the solid part, wherein the solid part is bent down from the handle, then backwards in a half circle, then up again, from there to the straight or slightly curved part to the right side, where it bends down again in a half circle, and a cushion formed on an extension on the right side of the straight or slightly curved part, wherein said cushion is movable upwards and to the side.

In a fifth preferred embodiment, the present invention provides a shower fall prevention device, comprising at least one rod fixed to a fixing point, an solid part fixed to the at least one rod on a straight or slightly curved part of the solid part, a handle connected to the solid part, wherein the solid part is bent down from the handle, then backwards in a half circle, then up again, from there to the straight or slightly curved part to the right side, where it bends down again in a half circle, and a cushion formed on an extension on the right side of the straight or slightly curved part, wherein said cushion is movable upwards and to the side.

In one embodiment according to the third to fifth preferred embodiment as described above the straight or slightly curved part of the solid part (or the bar) is extendable and retractable by a telescopic mechanism in the solid part.

In one embodiment according to the third to fifth preferred embodiment as described above the rod and the solid part have a full cushion placed around the whole area.

In a sixth embodiment, a shower fall prevention system is provided, comprising a shower fall prevention device according to one the third to fifth embodiment as described above, a switch having wireless connectivity and a battery, attached to the belt or the retraction unit, and a computing device wirelessly connected to the switch and sending alarm information if the switch is activated.

In the sixth embodiment, the shower fall prevention system further comprises a switch having wireless connectivity to the computing device and a battery integrated to the cushion.

3. BRIEF DESCRIPTION OF THE DRAWINGS

All figures presented herein are of a schematic nature and parts should be interpreted in relation to another only. The drawings and the description use reference signs to facilitate the understanding of the present invention. Wherever appropriate, same reference signs are used to label same or similar parts of the invention.

4. DETAILED DESCRIPTION OF THE INVENTION

1: Device Against Drowning in Bathroom Tubs—Manual Version

Figure 1:
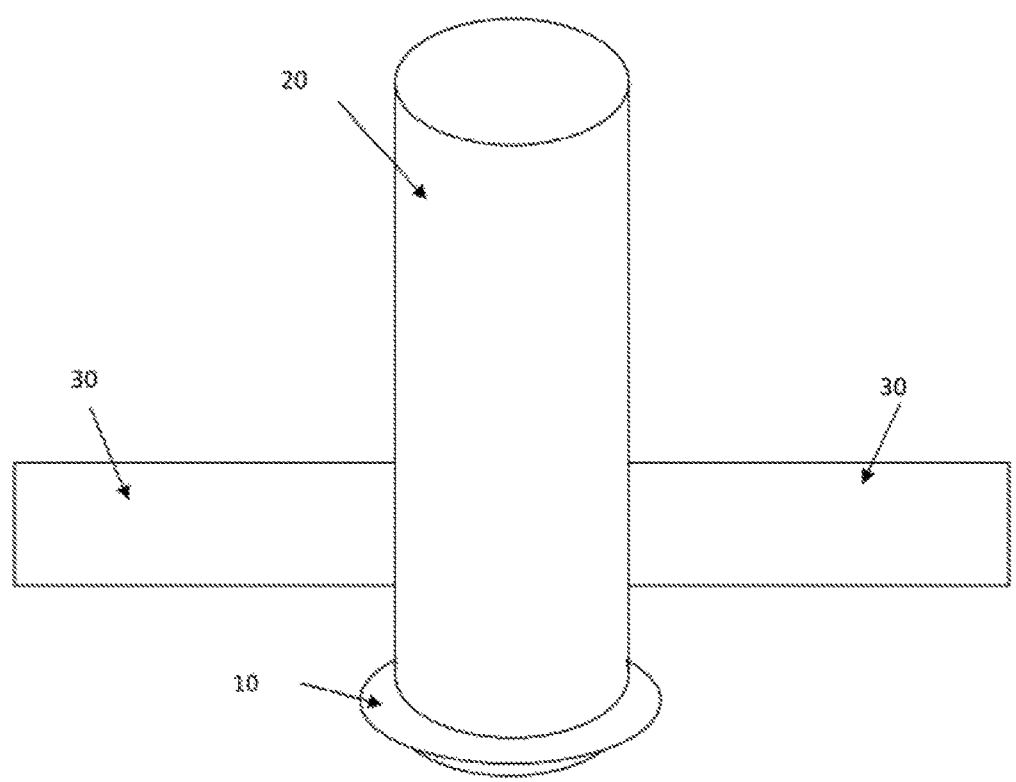
FIG. 1 is a schematic diagram of a bath plug device according to a preferred embodiment of the present invention.

FIG. 1 is a schematic diagram of a bath plug device according to a preferred embodiment of the present invention. According to FIG. 1, a cone 20 is used attached to the top of the bath plug 10, at least one pedal-like unit 30 (preferably two units as shown in FIG. 1) to the left and/or to the right of the cone 20 are attached, covering more or less the whole span of the bath tub. The user is supposed to have his feet not on the side of the cone, but closer to his own body, preferably by lifting his knees slightly.

Once the user becomes unconscious, the body moves down along the bath tub, the feet pushing against the pedals 30 or the cone 20 itself. This moves the cone 20 away from the user and lifts the bath plug 10, allowing the water to flow out. In one embodiment, the bath plug device has an overall density which is slightly below the density of water (e.g. by choice of material of the bath plug formed cavities in the plug that contain air) such that the bath plug device starts to float as soon it is detached from the pipe. Thus, the bath plug 10 will not return to a pipe closing state once it is detached such that drain off of the bath tub water is not disturbed.

With the lowering of the water level, the chance of survival increases dramatically. It is then only a matter of the speed of the water flowing out and the time needed for the bath tub to drain. This can be calculated by the diameter of the pipe and the water level.

2: Bathroom Tub Drowning—Electric Version

In an electric version (not shown), the cone 20 is placed on top of the draining pipe. However, the bath plug 10 resides in the cone 20, the plug being connected with a fixed wire to either an electric motor or a compressed air tube and a tilt sensor, e.g. a girometer fixed inside the cone 20, which in turn are wirelessly connected to a bath security switch and/or a house server providing safety services like software that may trigger an alert at official services (a call center, police, ambulance, fire department etc.). On the side of the cone 20, between the plug 10 and the motor or tube, the cone 20 has an opening. In the fully retracted mode, the plug is above the opening.

Once the bathroom switch is pressed, this information is transmitted to the cone 20, causing the electric motor or compressed air tube to lift the plug over the opening. This causes water to enter the cone 20 and flow through the now-open drain pipe, thus lowering the water level. The pedals 30 described earlier can potentially be attached to the electric embodiment of the cone 20 as well.

If the cone 20 is pressed down, the embedded girometer can trigger the upward movement of the motor or tube, and send a distress signal to the bathroom security switch and/or the house server such that further safety services are informed. E.g. a call center operator may first be allowed to communicate to the user in the bathroom and, if the user does not react, pictures or even a video signals may be transmitted to the operator. However, other safety means, like informing neighbors, residents of the home, or nearby relatives ("first responders"), may be triggered in addition or as an alternative. Such information may be provided via software on mobile phones of the respective first responders. Such measures (i.e. who should be informed in what case) may be selected by the user beforehand.

3: Shower Fall Prevention

Figure 2:
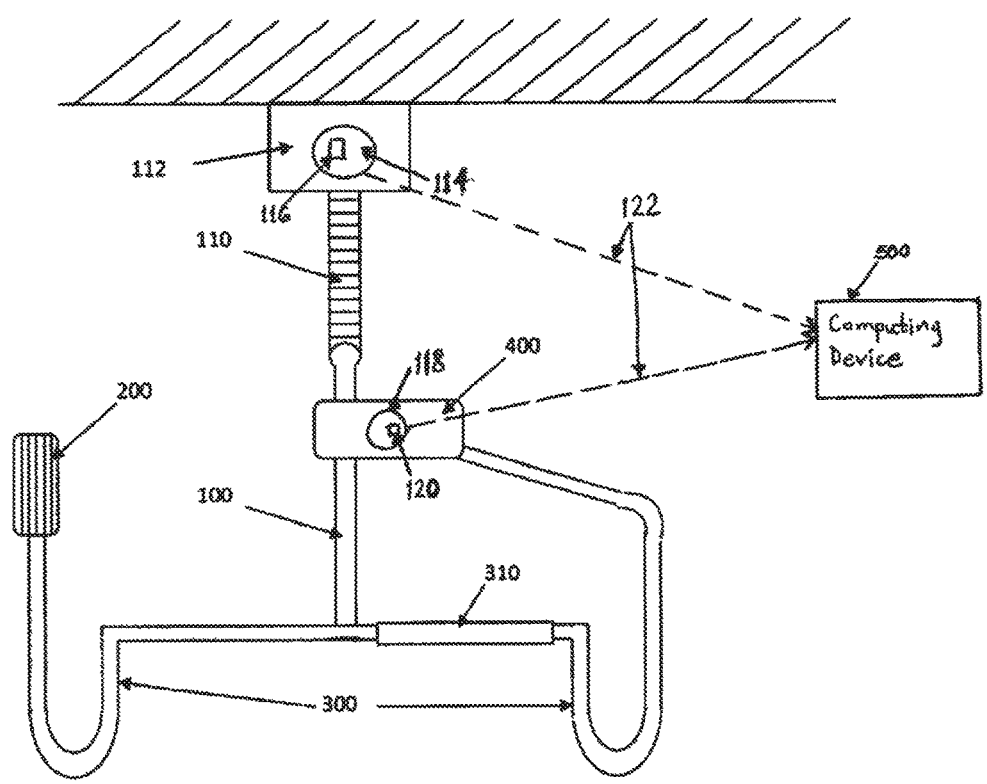
FIG. 2 is a schematic diagram of a shower fall prevention device according to a first preferred embodiment of the present invention.
Figure 3:
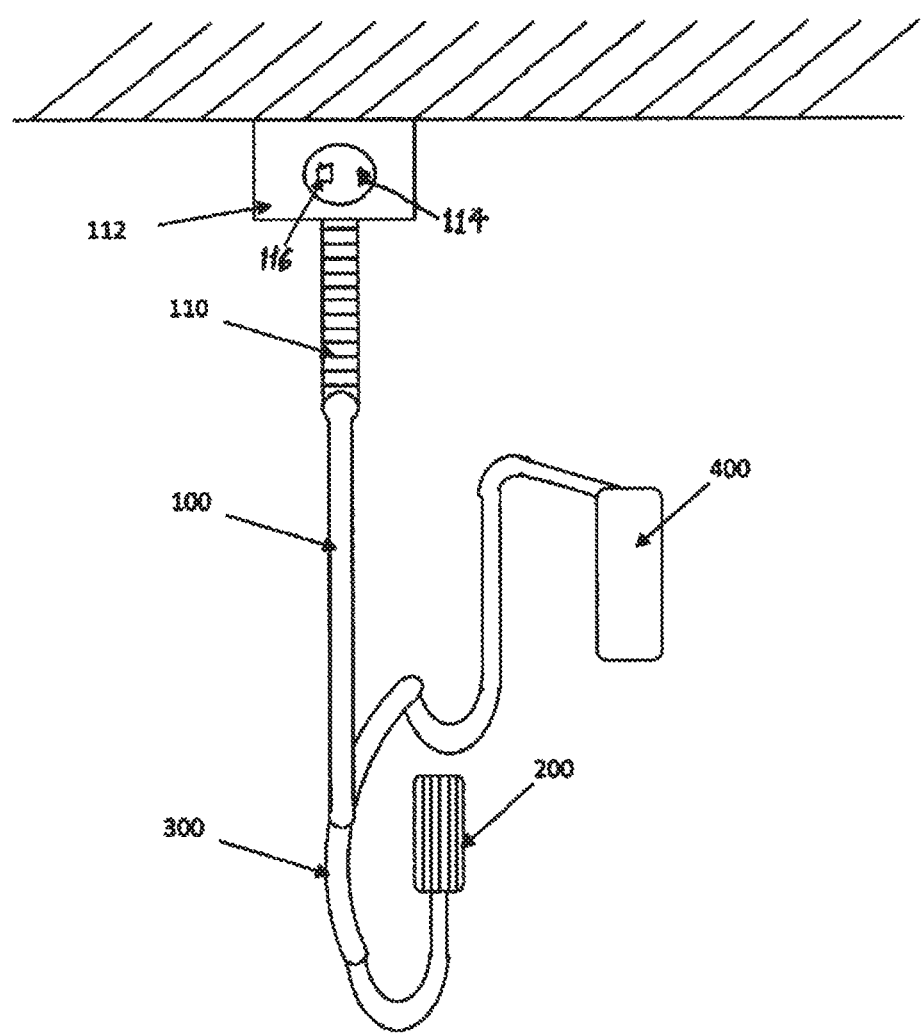
FIG. 3 is a perspective view diagram of a shower fall prevention device according to the first preferred embodiment of the present invention.

FIG. 2 is a schematic diagram of a shower fall prevention device according to a first preferred embodiment of the present invention. FIG. 3 is a perspective view diagram of a shower fall prevention device according to the first preferred embodiment of the present invention. The present invention has been made to give ease of movement. Normally, the structure does not require contact with the skin.

Hardware

A rod 100, preferably made from iron or stainless steel, described is fixed to the ceiling near the center of the shower ceiling either by a strong rubber band (not shown) with very little leeway or preferably—for user comfort—by an extendable and retractable belt 110 is rolled up in a box 112 similar to a safety belt retraction unit. If the unit is attached to a bath room, it will be placed on the ceiling, vertically aligned to where the person usually stands while showering.

To the left side of the rod 100, a handle 200 is attached. An solid part 300 is bent down from the handle 200, then backwards in a half circle, then up again, from there in a straight or slightly curved line (indicated in FIG. 3) to the right side, where it bends down again in a half circle. The solid part 300 is fixed to the rod 100 at or near the middle of the straight or slightly curved part.

Said straight or slightly curved part is extendable and retractable, e.g. by a telescopic mechanism 310 in the rod, as an example but not limited to a expansion plug telescopic rod or other suitable detent mechanisms. The solid part 300 is bent up again, then to the left to about one half of the full width of the unit. At that point a small, soft cushion 400 is placed; in a preferred version of the unit, this cushion 400 can be moved upwards and to the side and may be locked in a position by a suitable locking mechanism. The cushion 400 is provided to prevent injuries of face and head of a user slipping in the shower and falling forward towards the shower wall (not shown).

For more comfort the rod 300 can have a full cushion (not shown) placed around the whole area, in particular where the armpits would fall. In an alternative version, shower walls can be covered with a delta-shaped cushion (not shown), in which the long side of the triangle is attached to the wall, the shortest side under the longer side of the cushion triangle.

Figure 4:
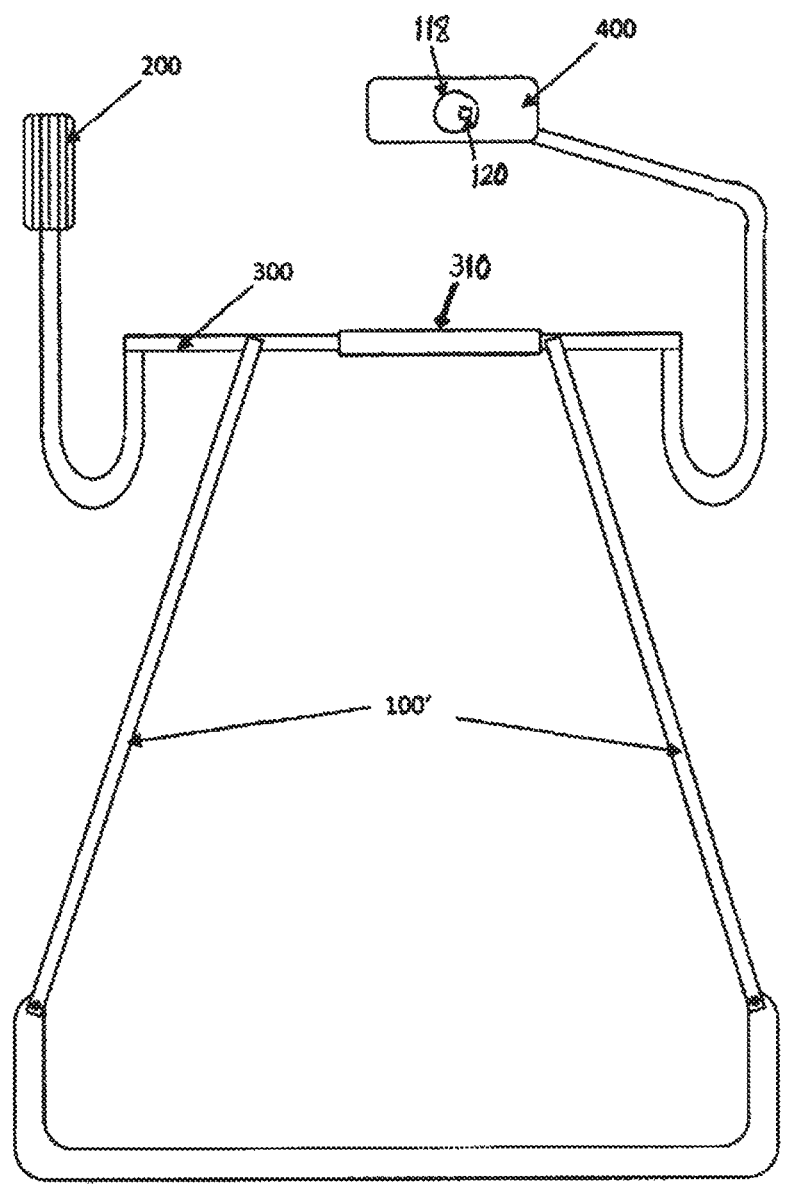
FIG. 4 is a schematic diagram of a shower fall prevention device according to a second preferred embodiment of the present invention.

FIG. 4 is a schematic diagram of a shower fall prevention device according to a second preferred embodiment of the present invention. Basically, the embodiment of FIG. 4 corresponds to the embodiment shown in FIGS. 2 and 3. The difference between said embodiments is the manner in which the rod 100' of FIG. 4 is fixed. Rod 101' does not have a fixing to a flexible member like in FIGS. 2 and 3 (belt 112) but instead comprises one or more solid rods 100' fixed to fixing points somewhere in the shower. E.g. rod 100' may be fixed directly to a shower tub or to walls surrounding the shower. Number and stability of rods 100' are chosen such that the device provides enough stability to support a falling person. Care should be taken to not place the rods 100' such that the user is hindered at entering and leaving the shower.

Method of Use

The user enters the shower and moves his body through the opening in front of the fall prevention unit, so that the straight or slightly bent part is close to his back, running from shoulder to shoulder. He puts his left arm through the left part, his left armpit over the unit's left half circle; his left hand grabs the handle 200 on his left side. He then stretches his right arm over the right half circle. He moves the unit on the back below his shoulders and extends or retracts the unit to a comfortable width, then places the soft cushion 400 in front and near his head.

Once the user has put on the solid part of the mechanism, he or she may move freely inside the shower, only obeying that the left and right curves stay below the shoulders.

Functionality

In the case of a fall, the body of the user moves downward and/or forward. The forward movement is stopped on the left side by the solid piece with the handle 200 and in the middle by the cushion 400 near the face; this cushion stabilizes the head in the case in the case of a severe fall. The person slides down, having the fall stopped when the armpit falls in the downward half circles.

Then, the fall is stopped either by the rubber band (not shown) or by the lock of within the belt retraction unit 112.

The cushion on the wall (described above; not shown) would in severe cases cushion the back of the head against the wall; by placing the second-longest side on top, the head can slide down over the cushion, not having to move over a top or bottom step, which might cause additional head injuries.

Connection to a Home Security Unit

In a preferred version of the invention, a switch with a wireless connection 114 and battery 116 is attached to the belt 110 or the retraction unit 112. Once the impact is transmitted to the rubber band or the retraction unit locks, the switch 114 sends a signal 122 to a computing device 500, e.g., to either the remote server directly or to the bathroom switch unit, which uses this signal 122 as if the alarm has been triggered.

The switch 118 and battery 120 can also be integrated into the cushion 400 so that a strong push against the cushion triggers the alarm.

The invention claimed is:

1. A shower fall prevention device suitable for fixing on a ceiling of a shower, comprising:
   an extendable and retractable belt rolled up in a box in a retracted state and configured to fix the device to the ceiling of the shower at a fixing point; and
   two arm pit hooks configured to receive arms of a user and pivotably connected to the fixing point.

2. The shower fall prevention device according to claim 1, further comprising:
   a rod connected between the fixing point and a bar, wherein said arm pit hooks are connected on right and left ends of the bar.

3. The shower fall prevention device according to claim 2, further comprising:
   a handle next to the rod and connected to the bar via an extension of a free end of one of the arm pit hooks.

4. The shower fall prevention device according to claim 3, further comprising:
   a cushion formed on an extension of a free end of one of the arm pit hooks, wherein said cushion is movable upwards and sideways.

5. A shower fall prevention device, comprising:
   an extendable and retractable belt rolled up in a box in a retracted state and configured to be fixed to a shower ceiling near a center of the shower ceiling;

a rod configured to be fixed to the extendable and retractable belt;

an solid part configured to be fixed to the rod at or near a middle of a straight or slightly curved part of the solid part;

a handle positioned left of the rod and connected to the solid part, wherein the solid part is bent down from the handle, then backwards in a half circle, then up again, from there to the straight or slightly curved part to the right side, where it bends down again in a half circle; and a cushion formed on an extension on a right side of the straight or slightly curved part, wherein said cushion is movable upwards and sideways.

6. A shower fall prevention device, comprising:

at least one rod configured to be fixed to a fixing point;

a solid part configured to be fixed to the at least one rod on a straight or slightly curved part of the solid part;

a handle connected to the solid part, wherein the solid part is bent down from the handle, then backwards in a half circle, then up again, from there to the straight or slightly curved part to the right side, where it bends down again in a half circle; and a cushion formed on an extension on the right side of the straight or slightly curved part, wherein said cushion is movable upwards and sideways.

7. The shower fall prevention device according to claim 6, wherein the straight or slightly curved part of the solid part is extendable and retractable by a telescopic mechanism in the solid part.

8. The shower fall prevention device according to claim 6, wherein rod and the solid part have a full cushion placed around a whole area in which a person's arm pits may lie.

9. A shower fall prevention system, comprising:

the shower fall prevention device according to claim 1;

a switch having wireless connectivity and a battery, attached to a belt or a retraction unit; and a computing device wirelessly connected to the switch and configured to send alarm information if the switch is activated.

10. The shower fall prevention system according to claim 9, further comprising:

a switch integrated with the cushion and having wireless connectivity to the computing device and having a battery.

\* \* \* \* \*